T. C. HARGRAVE.
Improvement in Registering Steam-Gages.
No. 131,347. Patented Sep. 17, 1872.

2 Sheets--Sheet 1.

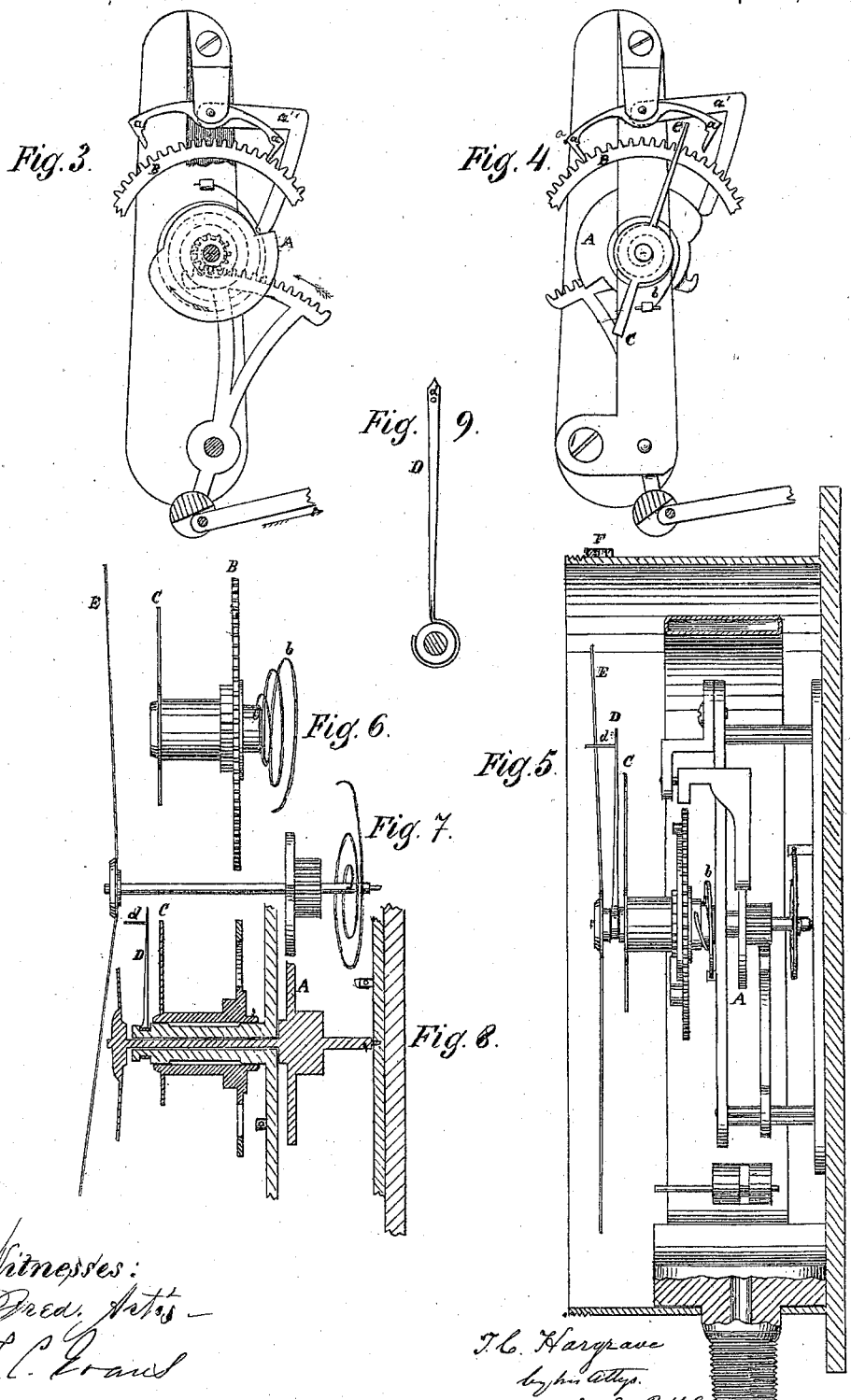

UNITED STATES PATENT OFFICE.

THOMAS C. HARGRAVE, OF BOSTON, MASSACHUSETTS.

IMPROVEMENT IN REGISTERING STEAM-GAGES.

Specification forming part of Letters Patent No. 131,347, dated September 17, 1872.

*To all whom it may concern:*

Be it known that I, THOMAS C. HARGRAVE, of the city of Boston, in the county of Suffolk and State of Massachusetts, have invented certain Improvements in Steam-Gages, of which the following is a full, clear, and exact description, reference being had to the accompanying drawing, in which—

Figure 1:
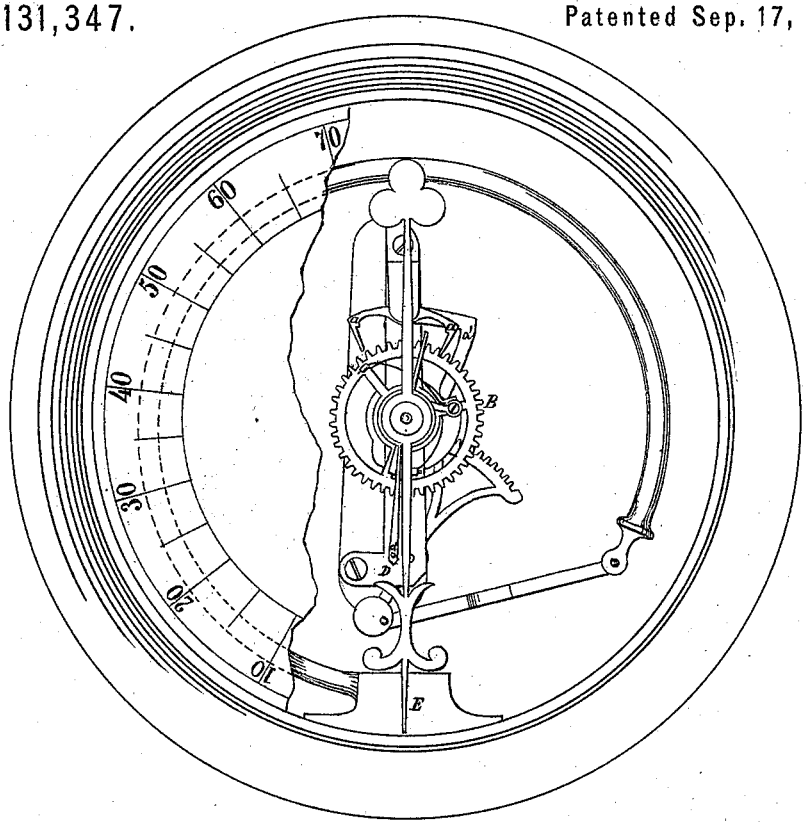
Figure 2:
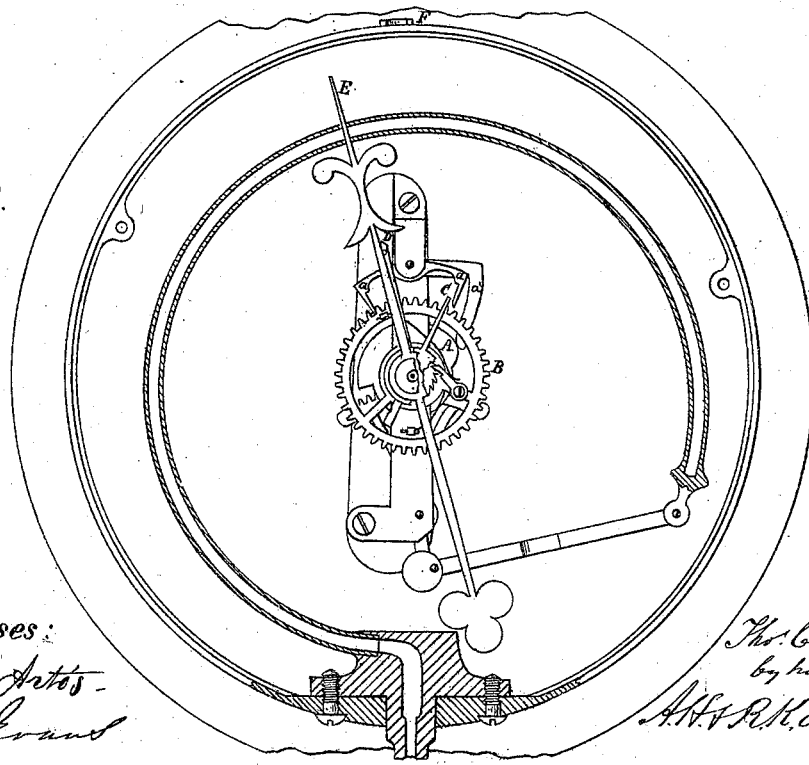

Figure 1 is a broken front view of a steam-gage with my attachment applied. Fig. 2 is a front view of the same with the face-plate entirely removed. Fig. 3 is a view, showing the cam. Fig. 4 is a view, showing the recording-hand C. Fig. 5 is a cross-vertical section of a gage with my attachment. Fig. 6 represents the escapement-wheel and spring and the recording-hand C detached from the gage. Fig. 7 represents the cam and spring and main hand E detached from the gage. Fig. 8 is a longitudinal section through the main shaft of the gage with the springs omitted. Fig. 9 is a detached view of the stop-hand D.

The object of my invention is to provide any steam-gage with an attachment that shall automatically record the number of times the pressure in the boiler, to which a gage provided with said attachment may be connected, exceeds any determined pressure; and also shall record the highest pressure reached at any time with the least resistance to the action of the gage-spring.

In order that those skilled in the art may make and use my invention, I will proceed to describe the manner in which I have carried it out.

The attachment consists of a cam, A, Fig. 4, connected with the main shaft of the gage, a lever, $a'$, and pallets $a\ a$, and an escapement-wheel, B, operated by a spring, $b$, or other appliance, independent of the power of the gage-spring. The cam is adjustable, and so placed upon the main shaft that when the gage indicates a certain pressure, the cam shall have moved the lever, and lifted a pallet, and escaped a tooth of the wheel, the hand C attached to the wheel recording by its position the fact that a certain pressure has been exceeded once, and also recording each time that the desired pressure has been exceeded. The stop-hand D, showing the highest pressure attained, is of peculiar construction, and is moved by a pin, $d$, inserted near the point or in the main hand E of the gage. The stop-hand is so constructed as to clasp tightly the shaft upon which it turns, (see Fig. 9,) and the slightest pressure received from the main hand acts against and relieves the clasp upon the shaft, and moves the hand. When that pressure is taken off the clasp holds the hand steadily in place. The hand D is made fine and light, and has not weight enough to act against the clasp when jarred. The gage case and cover is provided with a socket or recess, F, so that when the gage is adjusted for use this socket or recess may be filled with wax and sealed to prevent the movements being tampered with.

I do not claim broadly the application of a registering device to a steam-gage for indicating the number of excesses beyond the prescribed limit; but

What I claim as my invention, and desire to secure by Letters Patent, is—

1. In a registering gage, I claim the arrangement of the adjustable cam A, lever $a'$, pallets $a\ a$, and escapement-wheel B, in combination with the auxiliary spring $b$ for operating the registering hand C, independent of the gage power, substantially as described.

2. The stop-hand D, constructed with one end turned into a spring-clasp, substantially as shown, and for the purpose specified.

T. C. HARGRAVE.

Witnesses:
  DANIEL PRATT,
  GEO. E. BETTON.